June 1, 1926.
J. E. TWEEDY
1,586,540
APPARATUS FOR USE IN THE MANUFACTURE OF HORSESHOES
Filed Jan. 29, 1924   6 Sheets-Sheet 1
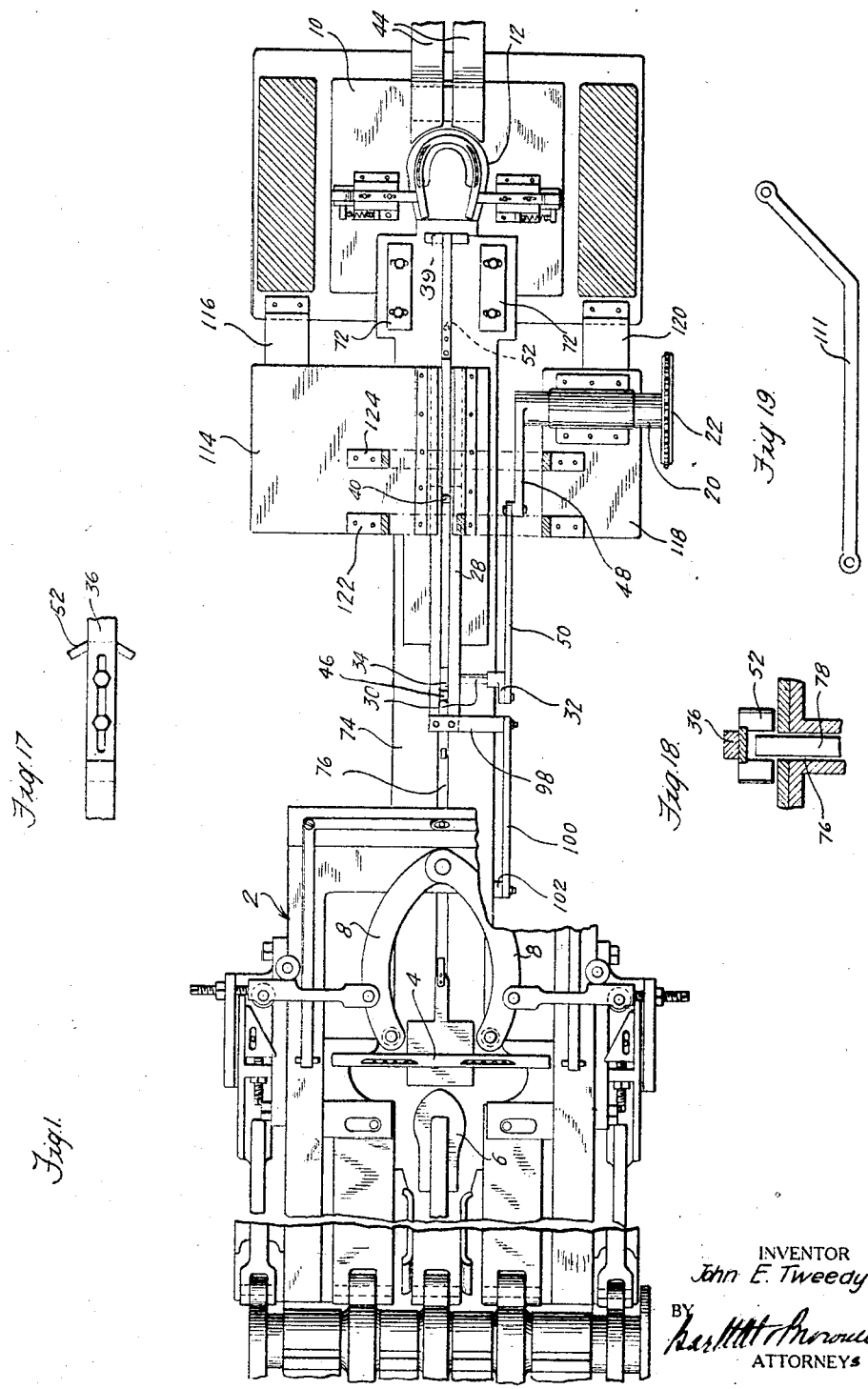
INVENTOR
John E. Tweedy
BY
ATTORNEYS

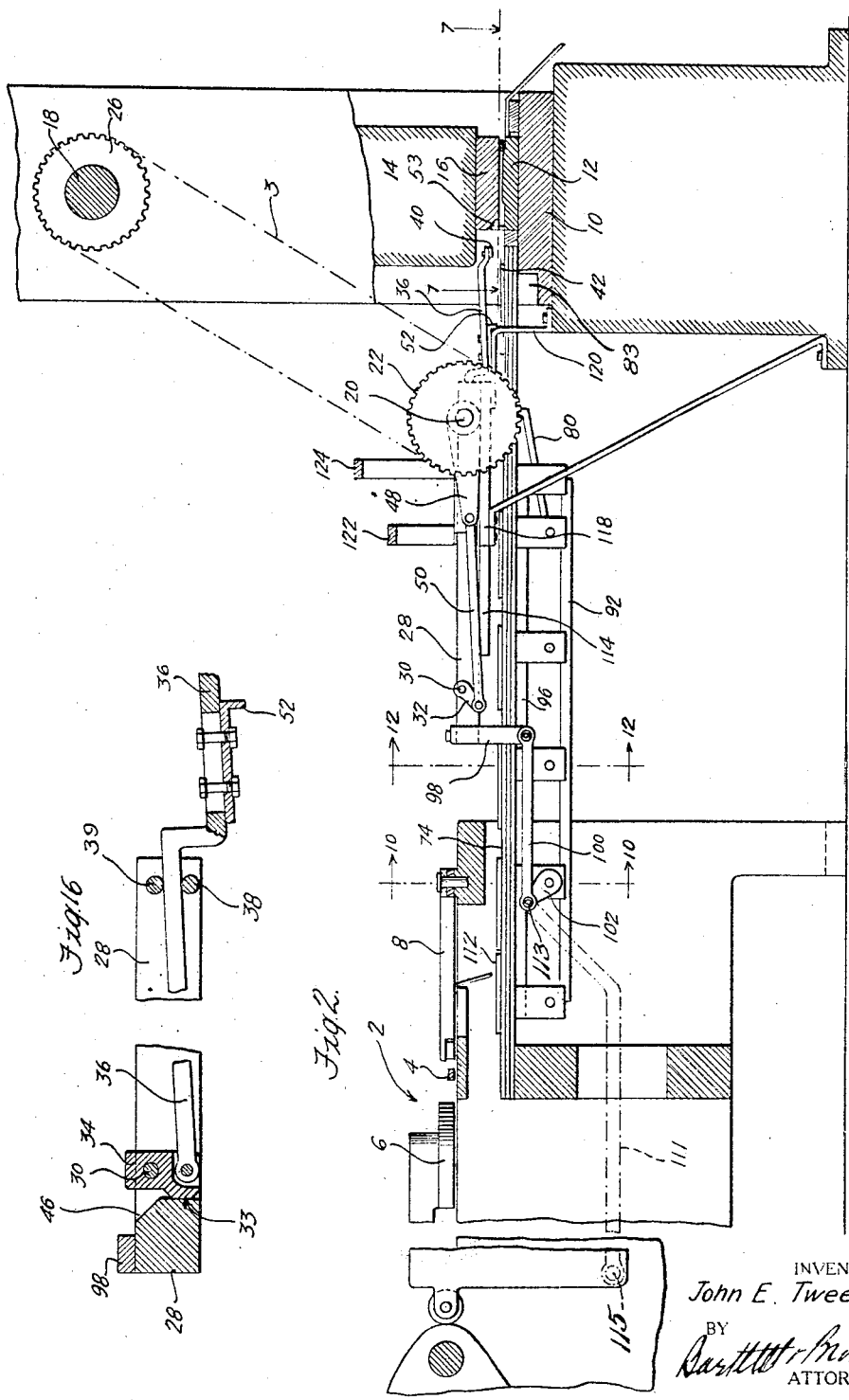

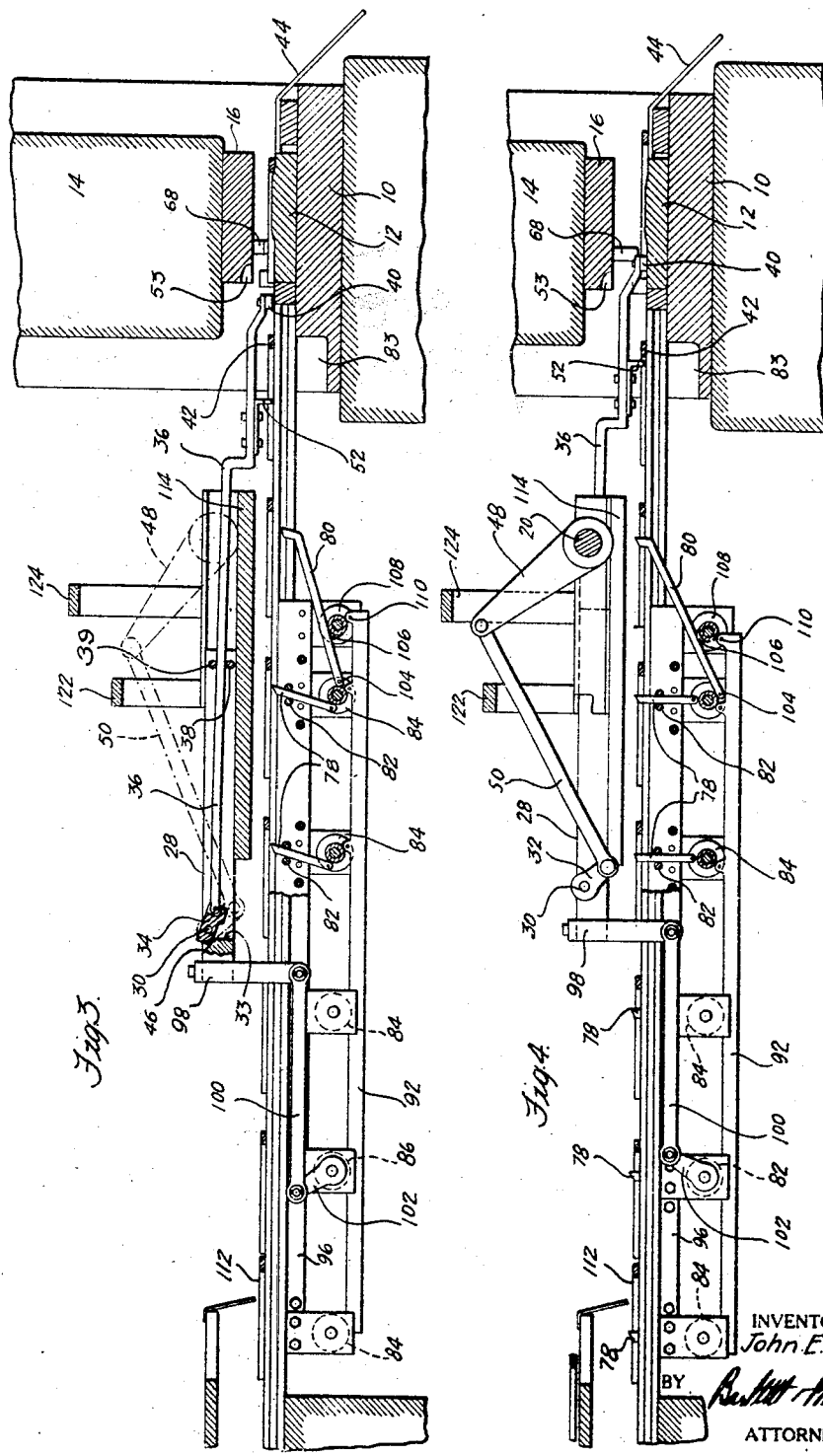

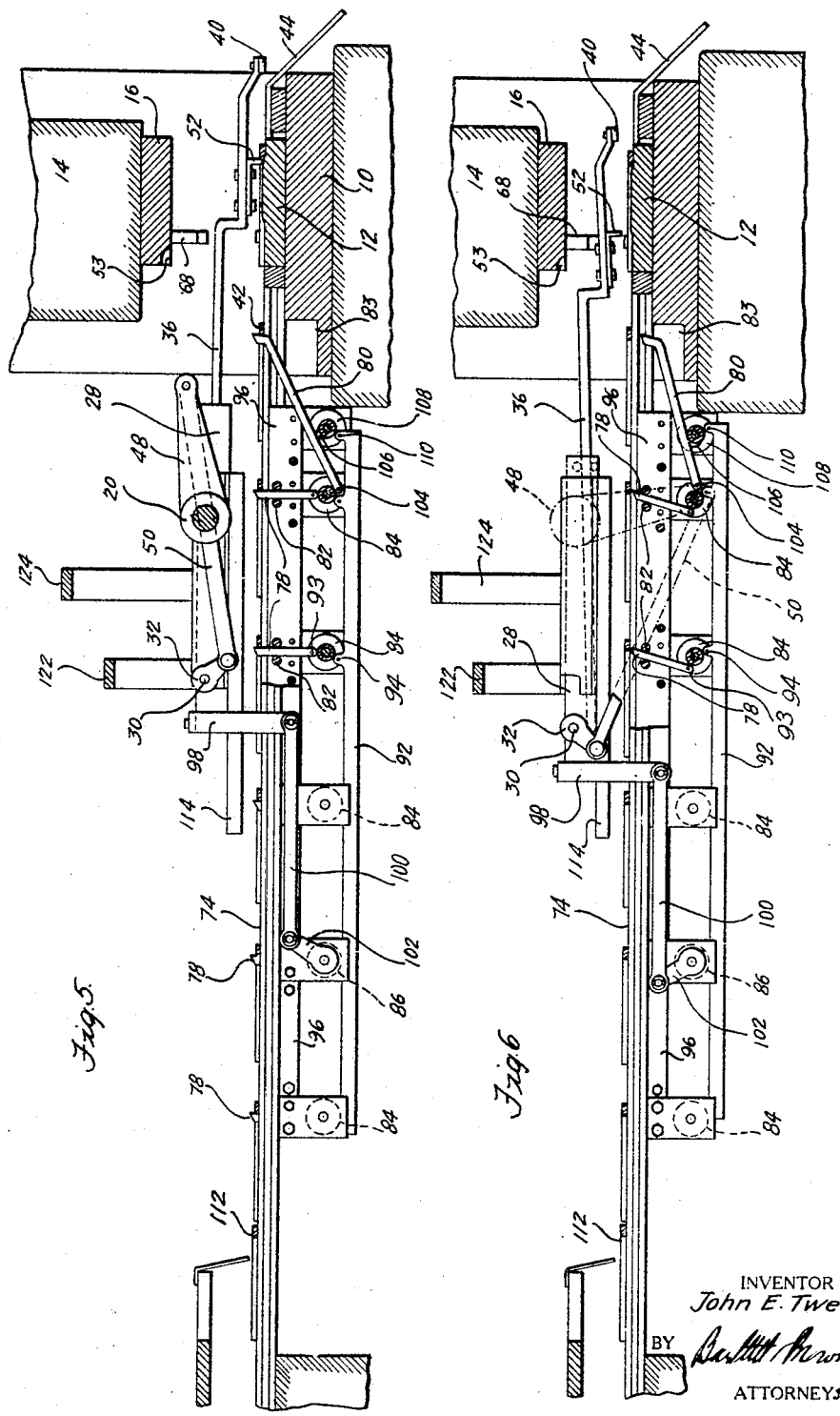

June 1, 1926.
J. E. TWEEDY
1,586,540
APPARATUS FOR USE IN THE MANUFACTURE OF HORSESHOES
Filed Jan. 29, 1924   6 Sheets-Sheet 5
Fig. 7.
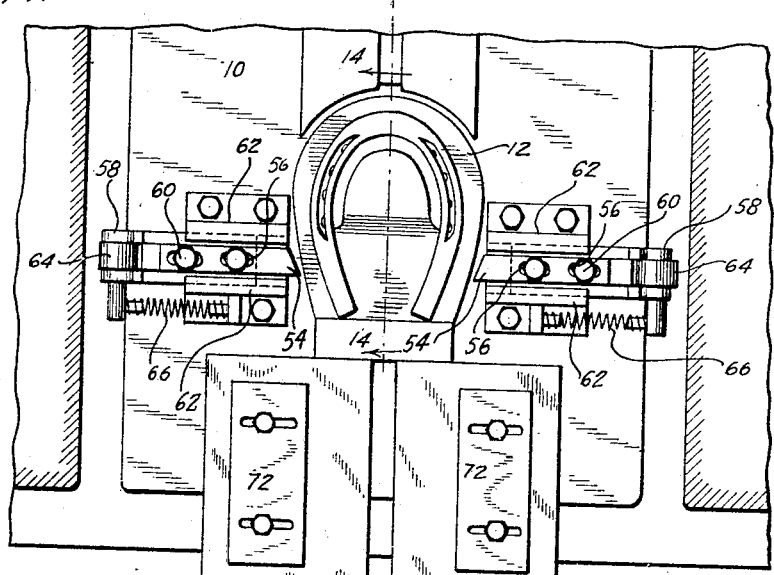
Fig. 8
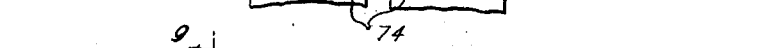
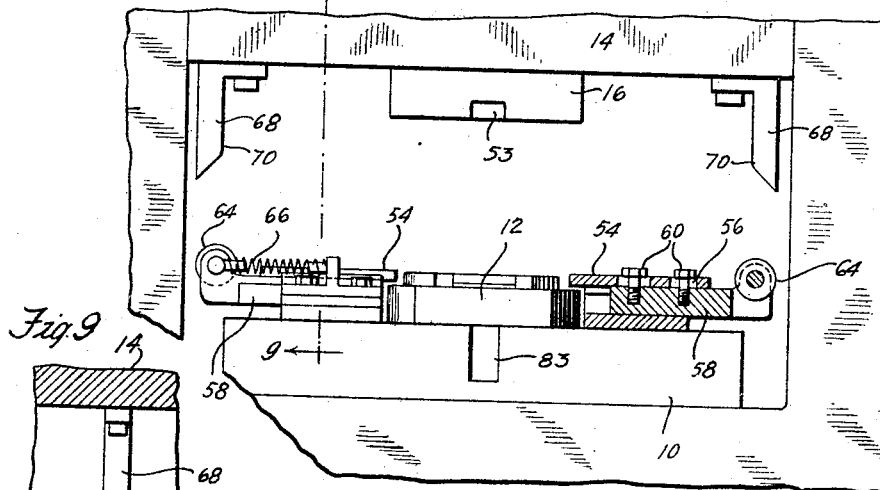
Fig. 9
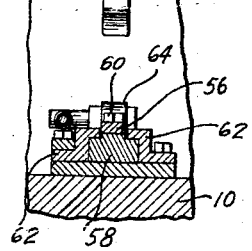
INVENTOR
John E. Tweedy.
ATTORNEYS June 1, 1926.
J. E. TWEEDY
1,586,540
APPARATUS FOR USE IN THE MANUFACTURE OF HORSESHOES
Filed Jan. 29, 1924    6 Sheets-Sheet 6
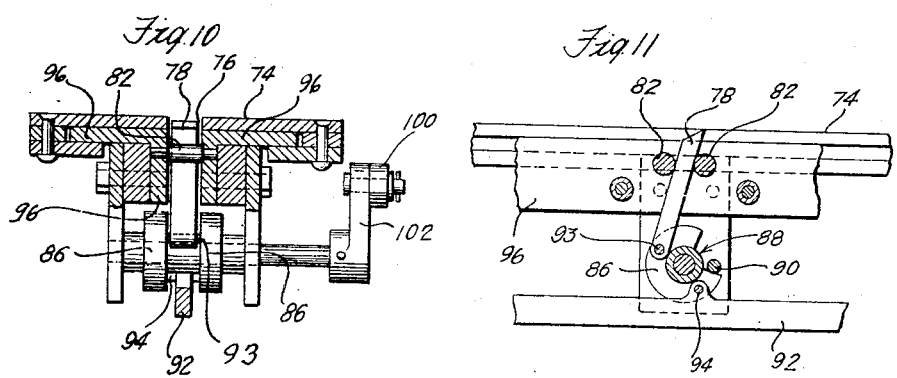
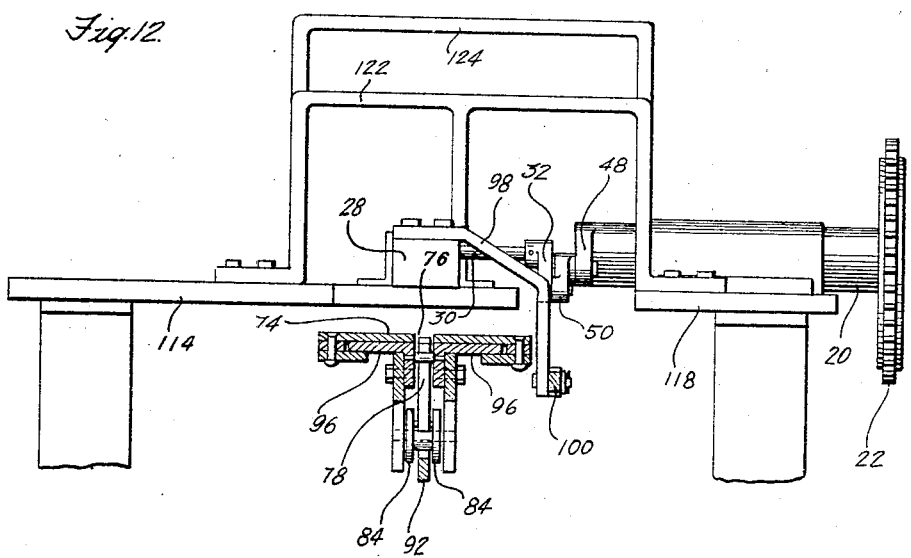
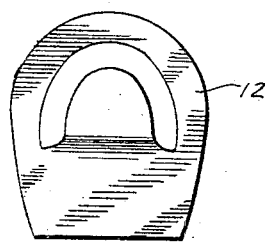 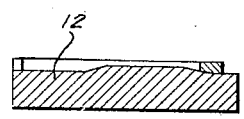 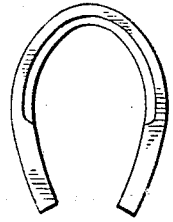
INVENTOR
John E. Tweedy
BY
ATTORNEYS Patented June 1, 1926.

1,586,540

UNITED STATES PATENT OFFICE.

JOHN E. TWEEDY, OF POUGHKEEPSIE, NEW YORK, ASSIGNOR TO PHOENIX HORSE SHOE COMPANY, OF CHICAGO, ILLINOIS, A CORPORATION OF ILLINOIS.

APPARATUS FOR USE IN THE MANUFACTURE OF HORSESHOES.

Application filed January 29, 1924. Serial No. 689,227.

My invention relates to an apparatus for pressing horse shoes and also to a combined bending and pressing apparatus and has for its object to automatically supply to a press an unpressed horse shoe and discharge a pressed horse shoe from the press. It further has for its object to provide means for automatically transferring horse shoes delivered from the bending machine to a press.
It further has for its object to provide means for automatically positioning the bent horse shoes angularly upon the press. It further has for its object to reduce the manual labor heretofore necessary in producing horse shoes and to secure other advantages as hereinafter pointed out.

The following is a description of an embodiment of my invention, reference being had to the accompanying drawings, in which, Figure 1 shows a portion of a horse shoe bending machine, a press partly in section so as to show the bed thereof, and a transfer mechanism;

Fig. 2 shows the same partially in side elevation and partially in section, along a central vertical plane;

Fig. 3 is a detail view, on a slightly enlarged scale, showing parts in side elevation and parts in section along a central vertical plane with the parts in retracted position;

Fig. 4 shows a similar section with parts slightly advanced;

Fig. 5 shows a similar section with the parts still further advanced, a shoe having just been discharged from the press;

Fig. 6 shows a similar section with the parts slightly retracted;

Fig. 7 shows an enlarged plan view of the bed of the press on the line 7—7, Fig. 2;
Fig. 8 shows an enlarged view of the bed of the press and plunger, looking from the direction of the bending machine;

Fig. 9 is a sectional detail of the means for centering the shoe upon the bed of the press, on the line 9—9, Fig. 8;

Fig. 10 shows a transverse sectional view of a portion of the carrier mechanism on the line 10—10, Fig. 2;

Fig. 11 is a side elevation of the same with parts shown in section;

Fig. 12 shows a section on the line 12—12, Fig. 2;

Fig. 13 is a plan view of the lower die of the press;

Fig. 14 is a sectional view of the same with a horse shoe thereon, on the line 14—14, Fig. 7; and Fig. 15 is a view of the under side of the horse shoe after the pressing operation.

Fig. 16 is a detail view partially in section, showing the rear end of the pusher and parts connected therewith;

Fig. 17 is a detail of a portion of the pusher;

Fig. 18 is a section showing an end view of the parts shown in Fig. 17 and the finger associated therewith;

Fig. 19 is a view of a link which may be used for operating the feeding means from the shoe bending apparatus when said feeding means is disconnected from the press.

Referring more particularly to the drawings, 2 is a broken plan view of a horse shoe blank-bending machine of the well known type shown more in detail in the patent to Enoch Boone, No. 1,420,518, dated June 20, 1922, 4 being the blank about to be bent, 6 being the reciprocating bending plunger and 8 being the formers operating in the well known way. 10 is the bed of the press having the lower die block 12 and plunger 14 carrying the upper die block 16, the plunger being operated by a cam shaft 18 substantially in the manner shown in Patent No. 1,420,517, granted to Enoch Boone, June 20, 1922, these parts being of ordinary construction.

In order to feed the horse shoe to the press so as to embody my invention I provide a crank shaft 20 carrying a sprocket wheel 22 which is connected by a sprocket chain 3 to a sprocket wheel 26 upon the cam shaft 18, the ratio being a one to one ratio so that the crank shaft 20 makes one revolution for each complete reciprocation of the plunger of the press. I also provide a slide 28 on which is mounted a shaft 30 having a crank arm 32 and a secondary crank arm 34 to which is pivoted the rear end of a pusher 36, the body portion of this pusher sliding over a supporting rod 38 and between that rod and a rod 39. The forward end of this pusher is provided with a feeding finger 52 which is adapted to engage a horse shoe 42 located behind the die of the press and move it on to the lower die block of the press and a pushing finger or head 40 which simultaneously engages a pressed horse shoe on the lower die block of the press and discharges it from the press over the guide 44. The slide 28 is provided with a stop 46 which acts to limit the upward throw of the secondary crank arm 34.

The rearward movement of the crank 32 and secondary crank arm is limited by a stop 33 formed on the slide 28, as shown in Fig. 16. The crank arm 48 on the shaft 20 is connected by a link 50 to the crank 32.

As the press operates the crank arm 48 is revolved in a clockwise direction synchronously with the movement of the plunger of the press.

Starting with the parts in the position shown in Fig. 2, the movement of the crank arm 48 results in moving the crank 32 to the position shown in full lines and dotted lines in Fig. 3, the movement being limited by the stop 46. This elevates the rear end of the pusher and causes its forward end to be depressed to the position shown in Fig. 3. A further movement of the crank arm 48 causes the slide with the pusher thus positioned, as shown in Fig. 3, to move forward to the position shown in Fig. 4, at which position a secondary finger 52 carried by the pusher comes in contact with the horse shoe 42, the head 40 moving into engagement with the heel of the horse shoe upon the lower die block and slightly moving the same.

A further revolution of the crank shaft 48 causes the head 40 to discharge the shoe from the press and causes the secondary finger 52 to move the horse shoe 42 forward fully on to said lower die block, as shown in Fig. 5. A further movement of the crank 48 to the position shown in Fig. 6 causes the crank arm 32 to move backward until blocked by the stop 33, resulting in the depression of the rear end of the pusher and the elevation of its forward end, as shown in Fig. 6. A further movement of the crank arm 48 causes the slide 28 to be retracted, the forward end of the pusher being still in elevated position so that the fingers 52 and 40 both move backwardly over the horse shoe which is upon the bed of the press, until the slide reaches the position shown in Fig. 2, the crank 48 being then in line with the link 50, and the parts being in the position shown in Fig. 2. At or just before this time the plunger of the press reaches its lowermost position, the pusher having been retracted out of the way, and the shoe in the press is being pressed. A further movement of the shaft 18 and crank arm 48 results in raising the plunger of the press and the repetition of the movements of the pusher just described. The upper die of the press is cut away slightly at 53 so as not to interfere with the head of the pusher. In this manner the automatic feeding and discharge to the press of horse shoes positioned at the point occupied by the horse shoe 42 is accomplished by the simple and effective mechanism.

In order to secure the proper centering of the horse shoes upon the lower die block of the press I provide centering devices, actuated by the plunger of the press and shown in plan view in Fig. 1 and on an enlarged scale, more in detail, in Figs. 7 and 9. These centering devices consist of two fingers 54 having elongated holes 56 whereby they are adjustably mounted upon slide blocks 58 by screws 60. These slide blocks move in suitable ways 62, as shown, and are provided upon their rear ends with anti-friction rollers 64. The fingers 54 are situated to the rear of the axis of the horse shoes, as placed upon the lower die block. The slide blocks 58 are normally held in retracted position by compression springs 66. The lower face of the pressed plunger is provided with downwardly depending cams 68 which have surfaces 70 constituting dwells. These cams engage the anti-friction rollers 64 just before the plunger reaches its lowermost position and causes the slide blocks 58, together with the fingers 54 to move until the fingers engage the shoe and turn it about its axis so as to position it angularly upon the die block, at which time the dwells 70 reach the rollers 64 so that the plunger can complete its stroke without moving the fingers 54 further.

To assist in guiding the shoe as it is moved forward on to the lower die block, I provide guide plates 72 which are adapted to engage the sides of the shoe and insure its moving forward without turning to an objectionable degree upon its axis, thus insuring its being positioned so that it can receive a final proper angular adjustment by the action of the fingers 54. These guide plates 72 are adjustable as indicated and fingers 54 are also adjustable as indicated, thus enabling the parts to be adjusted to conform to shoes of different sizes.

In order to feed the shoes from the bending machine to the position occupied by the shoe 42, I provide a conveying mechanism in which I preferably operate from the press so that the shoes may be conveyed in exact synchronism with the pusher 36. In order to accomplish this result I provide a stationary table 74 upon which the shoes are slid, this table having a longitudinal slot 76 through which fingers 78 and 80 carried by a slide 96 are projected and retracted by means hereafter described. The fingers 78 play up and down between guide bars 82 and have their lower ends pivotally connected to pivoted members 84—86, which are here shown as divided disks, one of said disks 86 having a cutaway portion 88 embracing a stop 90 carried by its support so as to limit its oscillatory motion and limit the oscillatory motion of the other members 84, the disks 84 and 86 being all connected together by a connecting rod 92 pivoted thereto, as shown at 94. The lower ends of the fingers 78 are connected at 93 to said members 84 and 86 so that when those members are turned clockwise to their limit, the fingers protrude through the slot on the table, as shown in Fig. 4, and when turned anti-clockwise to their limit, are withdrawn below the surface of the table, as shown in Fig. 6. The fingers thus move in unison.

These fingers and the disks operating them are carried by a slide 96 supported on the lower surface of the table 74 so as to slide relatively thereto, the table 74 being stationary.

The slide 96 in the construction shown in full lines in Figs. 1 to 6, inclusive, is reciprocated by power supplied through the press. To that end I provide the slide 28 with a depending arm 98 which is connected by a link 100 to a crank arm 102 carried by the shaft of one of the rotating members 84 and 86. I preferably connect it to the shaft of the stop engaging member 86. With this arrangement when the slide 28 with its depending arm 98 is being retracted, the crank arm 102 is moved from the position shown in Fig. 5 counter-clockwise to the position shown in Fig. 2. This results first in depressing the fingers 78 from the position shown in Fig. 5 to the position shown in Fig. 6, and when the fingers have been so depressed results in the backward movement of the slide 96 from the position shown in Fig. 5 to the position shown in Fig. 3. The next forward movement of the slide 28 results in the raising of the fingers 78 to the position shown in Fig. 4, and then results in the forward bodily movement of the slide 96 with its fingers 78 elevated to the position shown in Fig. 5.

In order to feed a shoe to the position occupied by the shoe 42 from the position occupied by the next preceding shoe, I provide the special finger 80, this being necessary because in the press as ordinarily constructed, even after the recess 83 has been formed in the bed plate, no room is present for extending the slide 96 so as to provide a finger similar to the finger 78. This auxiliary finger has its rear end pivoted to the forward member 84, as shown at 104, and in order to assist in its elevation I provide a cam 106 operated on an oscillating member 108 which is also pivoted to the connecting rod 92 at 110, this cam 106 being positioned so that it raises the finger 80 so as to cause it to project upon the table synchronously with the fingers 78. This finger, therefore, engages the shoe which is behind the shoe 42 and moves it forward, as shown in Fig. 5, to the position occupied by the shoe 42, whereupon the finger is depressed and moved backward to engage the preceding shoe. As before stated, a shoe in the position 42 is engaged by the supplemental finger 52 of the pusher and by it moved forward to the lower die block of the press.

The forming machine and the press should be run either in exact synchronism, or the forming machine should be run slightly slower than the press. On account of the difficulty of securing the exact synchronism, in practice, I run the former at a speed slower than synchronism. This prevents the shoes from being bent faster than the press operates and therefore prevents any piling up of the shoes. With this slower action the sequence of the shoes may be interrupted by one space from time to time, but that is a matter of no material consequence.

The construction above described is the preferred construction, although I have obtained approximate results by operating the slide 96 from the reciprocating plunger of the bending machine. In order to do this I remove the connecting link 100 and connect the crank arm 102 with the reciprocating member of the bending machine by a link 111 shown in full lines in Fig. 19 and in dotted lines in Fig. 2. When this connection is employed the failure of exact synchronism between the forming machine and the press may result in the forward fingers 78—80 being elevated when the pusher with the auxiliary finger 52 is moving backward and in order to prevent interference at such time I form the secondary finger 52 in two parts with an opening between them, as shown in Fig. 18 so that the finger 52 will bridge the space occupied by the forward finger 80. When this link is applied, the link 100 is removed and the link 111 has its forward end connected to the pivot 113 on the arm 102 and its rear end connected to a pivot 115 on the cam-actuated member of the bending machine.

A shoe when first bent by the bending machine falls down upon the table 74 in the position shown at 112, Fig. 2, where it is engaged by the first finger 78.

The finger 52 on the pusher is adjustable upon the pusher, as shown in Fig. 17, so as to be adapted for use with horse shoes of different sizes.

The slide 28 is supported by a table section 114 which is connected to the base of the press by supports 116, while the shaft 20 is mounted upon a table section 118 connected to the base of the press by supports 120 so as to leave a space between the two table sections for the passage of the crank arm 48. In order to steady these two tables and hold them fastened relatively to one another, I provide two yokes or bridging connecting members 122—124 which extend upwardly sufficient to be out of the way of the crank arm 48.

By the means above described, the bent shoes are fed forward as fast as they are formed and when they reach the neighborhood of the press are fed to the press so as to be located upon its lower die block and then discharged from thence after the pressing action, thus dispensing with the manual labor which has heretofore been necessary to transfer a bent shoe from the bending machine to the press. Furthermore, when my means are employed, the bending machine and the press can be operated at a faster rate so as to perform a greater amount of work than heretofore in a given time.

While I prefer to use the conveying means comprising the slide 96 with its fingers 78—80, in order to move the shoes up to the position occupied by the shoe 42 it is obvious that various other conveying means may be employed for this purpose and that the means for moving the shoe into the press and discharging it therefrom will act to produce that result whatever means may be employed for placing a shoe at said points. The conveying means shown and described has the advantage of automatically spacing the shoes as they slide along the table and bring the forward shoe to rest in a position where the fingers 52 of the pusher will surely pick it up.

As will be evident to those skilled in the art, my invention permits of various modifications without departing from the spirit thereof or the scope of the appended claims.

What I claim is:

1. In an apparatus for pressing bent horseshoe blanks, the combination of a press, a table extending from one side thereof adapted to support a horizontally disposed bent horseshoe blank, and means acting synchronously with the plunger of the press for moving a horizontally disposed bent horseshoe blank so supported onto the lower die block of the press when the plunger is in elevated position, said means comprising a reciprocating finger adapted to engage a bent horseshoe blank on said table, and a pusher in advance of and connected to said finger and adapted to engage a bent horseshoe blank previously acted on by said press and discharge it from said lower die.

2. In an apparatus for pressing bent horseshoe blanks, the combination of a press, a table extending from one side thereof adapted to support a horizontally disposed bent horseshoe blank, and means acting synchronously with the plunger of the press for moving a horizontally disposed bent horseshoe blank so supported onto the lower die block of the press when the plunger is in elevated position, said means comprising a reciprocating finger adapted to engage a bent horseshoe blank on said table, and a pusher in advance of and connected to said finger and adapted to engage a bent horseshoe blank previously acted on by said press and discharge it from said lower die, and parallel guide plates adapted to engage the outer sides of a bent horseshoe blank as it moves forward toward said lower die block.

3. In an apparatus for pressing horseshoes, the combination of a press having a stationary lower die on which a bent horseshoe blank when placed thereon is free to move laterally, a vertically reciprocating plunger having an upper die adapted to flatten a bent horseshoe blank, and horseshoe blank positioning fingers located on both sides of said stationary lower die adapted to be moved toward the central vertical plane of said die and engage the sides of a bent horseshoe blank thereon and move said blank to a definite position, and cams carried by the plunger adapted to engage said fingers during the downward movement of said plunger and cause them to move inward toward said plane and engage the sides of a horseshoe blank on said lower die, said cams having dwells engaging said fingers during the latter part of said downward movement and holding them temporarily fixed at points so that they are separated by the width of the horseshoe blank at the line of engagement.

4. In an apparatus for pressing horseshoe blanks, the combination of a press having a stationary lower die on which a bent horseshoe blank when placed thereon is free to move laterally, a vertically reciprocating plunger having an upper die adapted to flatten a bent horseshoe blank, and horseshoe blank positioning fingers located on both sides of said stationary lower die adapted to be moved toward the central vertical plane of said die and engage the sides of a bent horseshoe blank thereon and move said blank to a definite position, and cams carried by the plunger adapted to engage said fingers during the downward movement of said plunger and cause them to move inward toward said plane and engage the sides of a horseshoe blank on said lower die, said cams having dwells engaging said fingers during the latter part of said downward movement, and springs normally tending to retract said fingers, said dwells holding said fingers fixed at points so that they are separated by the width of the horseshoe blank at the line of engagement.

5. In an apparatus for pressing horse shoes, the combination of a press having a reciprocating plunger, a table adapted to support a horse shoe on one side of said press, a slide carried by said table, said slide having a shaft whose axis is at right angles to the path of movement of said slide and having a secondary crank arm, a pusher having its rear end pivotally connected to said secondary crank arm and its central portion slidingly supported, and having a primary finger at its forward end and a secondary finger to the rear thereof adapted to engage, respectively, horse shoes located upon the lower die of said press and behind said die, and means for oscillating said secondary crank arm and reciprocating said slide.

6. In an apparatus for pressing horse shoes, the combination of a press having a reciprocating plunger, a table adapted to support a horse shoe on one side of said press, a slide carried by said table, said slide having a shaft whose axis is at right angles to the path of movement of said slide and having a secondary crank arm, a pusher having its rear end pivotally connected to said secondary crank arm and its central portion slidingly supported, and having a primary finger at its forward end and a secondary finger to the rear thereof adapted to engage, respectively, horse shoes located upon the lower die of said press and behind said die, and means for oscillating said secondary crank arm, and reciprocating said slide, said means comprising a crank revolving synchronously with said plunger and a connecting link mechanically connected to said crank and shaft so as to oscillate said shaft.

7. In an apparatus for pressing horse shoes, the combination of a press having a reciprocating plunger, a table adapted to support a horse shoe on one side of said press, a slide carried by said table, said slide having a shaft whose axis is at right angles to the path of movement of said slide and having a secondary crank arm, a pusher having its rear end pivotally connected to said secondary crank arm and its central portion slidingly supported, and having a primary finger at its forward end and a secondary finger to the rear thereof adapted to engage, respectively, horse shoes located upon the lower die of said press and behind said die, means for oscillating said secondary crank arm and reciprocating said slide, said means comprising a crank upon said shaft, a second crank revolving synchronously with said plunger, and a link connecting said two cranks.

8. In an apparatus for pressing horseshoe blanks, the combination of a press having a stationary lower die and a vertically reciprocating plunger having an upper die adapted to flatten a bent horseshoe blank upon said lower die, a table for supporting a series of horizontally disposed bent horseshoe blanks adjacent to said lower die, means for feeding bent horseshoe blanks so disposed from a given point on said table to said lower die, means for discharging pressed horseshoe blanks from said lower die, a series of fingers lying in a vertical plane and spaced from one another, means for raising and lowering said fingers, and means for moving said fingers bodily forward when raised and moving them bodily backward when lowered so as to engage the central portions of bent horseshoe blanks and move them forward step by step to said given position.

9. In an apparatus for pressing horse shoes, the combination of a press, means for feeding horse shoes from a given point to the lower die of said press and discharging pressed horse shoes from said die, and a series of fingers spaced from one another and adapted to be raised and depressed, and means for moving said fingers bodily forward when raised and moving them bodily backward when depressed so as to successively supply horse shoes to said given position, and means for raising and lowering and bodily moving said fingers comprising pivotally mounted members, a connecting rod pivoted to said members, a crank arm connected to one of said members, a sliding plate carrying said fingers, members and crank arm, and means for oscillating said crank arm.

10. In an apparatus for pressing horse shoes, the combination of a press, means for feeding horse shoes from a given point to the lower die of said press and discharging pressed horse shoes from said die, and a series of fingers spaced from one another and adapted to be simultaneously raised and depressed, and means for moving said fingers bodily forward when raised and moving them bodily backward when depressed so as to successively supply horse shoes to said given position, and means for raising and lowering and bodily moving said fingers comprising pivotally mounted members, a connecting rod pivoted to said members, a crank arm connected to one of said members, a sliding plate carrying said fingers, members and crank arm, and a link connected to said first feeding member and a crank arm adapted to oscillate said crank arm and reciprocate said slide.

JOHN E. TWEEDY.